US008959140B1

United States Patent
Lin

(10) Patent No.: US 8,959,140 B1
(45) Date of Patent: Feb. 17, 2015

(54) SEAMLESS INTEGRATION OF CELLULAR AND INTERNET TEXT MESSAGING SERVICES

(75) Inventor: Zhijian Lin, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 265 days.

(21) Appl. No.: 13/097,962

(22) Filed: Apr. 29, 2011

(51) Int. Cl.
*G06F 15/16* (2006.01)
*H04L 12/58* (2006.01)

(52) U.S. Cl.
CPC ............... *H04L 51/36* (2013.01); *H04L 51/38* (2013.01)
USPC .......................................................... 709/203

(58) Field of Classification Search
None
See application file for complete search history.

(56) References Cited

U.S. PATENT DOCUMENTS

| | | | | |
|---|---|---|---|---|
| 7,245,929 | B2 * | 7/2007 | Henderson et al. | 455/466 |
| 7,505,777 | B2 * | 3/2009 | Kim | 455/466 |
| 2005/0251555 | A1 * | 11/2005 | Little, II | 709/206 |
| 2007/0213034 | A1 * | 9/2007 | Cai et al. | 455/412.1 |
| 2011/0287764 | A1 * | 11/2011 | Zitnik | 455/433 |
| 2011/0317684 | A1 * | 12/2011 | Lazzaro et al. | 370/352 |
| 2012/0117166 | A1 * | 5/2012 | Sharma | 709/206 |

OTHER PUBLICATIONS

Zitnik. Home Location Register Query Reduction Mechanism. U.S. Appl. No. 61/347,139. All Pages.*
Sharma, Method and System of Communication between Instant Messaging Clients and Mobile Cellular Devices. Feb. 10, 2010. U.S. Appl. No. 61/303,067. All Pages.*

* cited by examiner

*Primary Examiner* — Mohamed Wasel
*Assistant Examiner* — Tsung Wu

(57) ABSTRACT

A communication device may include a text messaging routing application. In response to a user-request to send a text message to a designated recipient over an Internet messaging system, the text messaging routing application may cause a query to be sent to the Internet messaging system asking whether the designated recipient of the text message is registered with the Internet messaging system or with an affiliate thereof. If the response to the query is in the negative, the text messaging routing application may cause the text message to be sent to the designated recipient over a cellular telephone network. If the response to the query is in the affirmative, the text messaging routing application may cause the text message to be sent to the designated recipient over the Internet using the Internet messaging system.

18 Claims, 3 Drawing Sheets

SEAMLESS INTEGRATION OF CELLULAR AND INTERNET TEXT MESSAGING SERVICES

BACKGROUND

1. Technical Field

This disclosure relates to text messaging, including text messaging applications which utilize cellular telephone networks and/or the Internet.

2. Description of Related Art

The use of text messaging continues to rapidly grow.

Many cellular telephone carriers offer their customers a text messaging application that which sends the customer's text messages over their cellular telephone network.

Other text messaging applications are available that the same customers may use, but that instead send their text messages over the Internet. Examples of these are Text Plus and Text Free. Customers may prefer to use an Internet text messaging application to avoid messaging charges which otherwise might be imposed by the cellular telephone carrier.

When using an Internet text messaging application, however, a problem can arise when the recipient of the text message is not a subscriber to the Internet text messaging system that is used by the Internet text messaging application. In this circumstance, the Internet text messaging system may not be able to route the message to the recipient over the Internet. Instead, the Internet text messaging system may need to route the message back through the customer's cellular telephone network.

To facilitate this routing, the Internet text messaging system may need to designate the senders address by what is known as a "dynamic short code," rather than the telephone number of the sender. This usually results in the dynamic short code appearing in the recipient's communication device as the sender's address, making it difficult for the recipient to easily recognize the identity of the sender.

SUMMARY

A communication device may include a text messaging routing application. In response to a user-request to send a text message to a designated recipient over an Internet messaging system, the text messaging routing application may cause a query to be sent to the Internet messaging system asking whether the designated recipient of the text message is registered with the Internet messaging system or with an affiliate thereof. If the response to the query is in the negative, the text messaging routing application may cause the text message to be sent to the designated recipient over a cellular telephone network. If the response to the query is in the affirmative, the text messaging routing application may cause the text message to be sent to the designated recipient over the Internet using the Internet messaging system.

The text messaging routing application may include a cache. The text messaging routing application may be configured to temporarily store the response to the query in the cache. In response to a subsequent user-request to send a subsequent text message over a subsequent Internet messaging system to a subsequent designated recipient, the text messaging routing application may check to see whether the cache contains information which indicates that the subsequent designated recipient is registered with the subsequent Internet messaging system or with an affiliate thereof. If the cache does not contain this information, the text messaging routing application may cause a subsequent query to be sent to the subsequent Internet messaging system asking whether the subsequent designated recipient is registered with the subsequent Internet messaging system or with an affiliate thereof. If the information in the cache or the response to the query does not indicate that the subsequent designated recipient is registered with the subsequent Internet messaging system or an affiliate thereof, the text messaging routing application may cause the subsequent text message to be sent to the subsequent designated recipient over the cellular telephone network. If the information in the cache or the response to the query does indicate that the subsequent designated recipient is registered with the subsequent Internet messaging system or an affiliate thereof, the text messaging routing application may cause the subsequent text message to be sent to the subsequent designated recipient over the Internet using the subsequent Internet messaging system.

The communication device may include a cellular text messaging application configured to send text messages to designated recipients over the cellular telephone network under the control of the text messaging routing application.

The communication device may include an Internet text messaging application configured to send text messages to designated recipients over the Internet using the Internet messaging system under the control of the text messaging routing application. The text messaging routing application may or may not be part of the Internet text messaging application.

The text messaging routing application, the cellular text messaging application, and the Internet text messaging application may be part of a smart phone.

An Internet messaging system may include a text messaging control application configured to receive a query from a sender's communication device asking whether a designated recipient of a text message is registered with the Internet messaging system or with an affiliate thereof. In response to the query, the text messaging control application may determine whether the designated recipient is registered with the Internet messaging system or with an affiliate thereof and send a response back to the sender's communication device indicating whether the designated recipient is registered with the Internet messaging system or with an affiliate thereof.

The text messaging control application may receive the text message from the sender's communication device and cause the received text message to be routed to the designated recipient.

The text messaging control application may determine whether the designated recipient is registered with the Internet messing system or an affiliate thereof by checking an Internet messaging user database which contains information indicative of designated recipients which are registered with the Internet messaging system and designated recipients which are registered with an affiliate thereof.

The text messaging control application may receive the text message from the sender's communication device and cause the received text message to be routed to the designated recipient over the Internet messaging system if the information in the database indicates that the designated recipient is registered with the Internet messaging system, or over an Internet messaging system managed by the affiliate if the information in the database indicates that the designated recipient is registered with the affiliate.

The text messaging control application may be configured to deliver the received text message to the Internet messaging system managed by the affiliate if the information in the database indicates that the designated recipient is registered with the affiliate.

Tangible, non-transitory, computer-readable media may contain a program of instructions configured to implement one or more of the functions of the applications and systems described herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
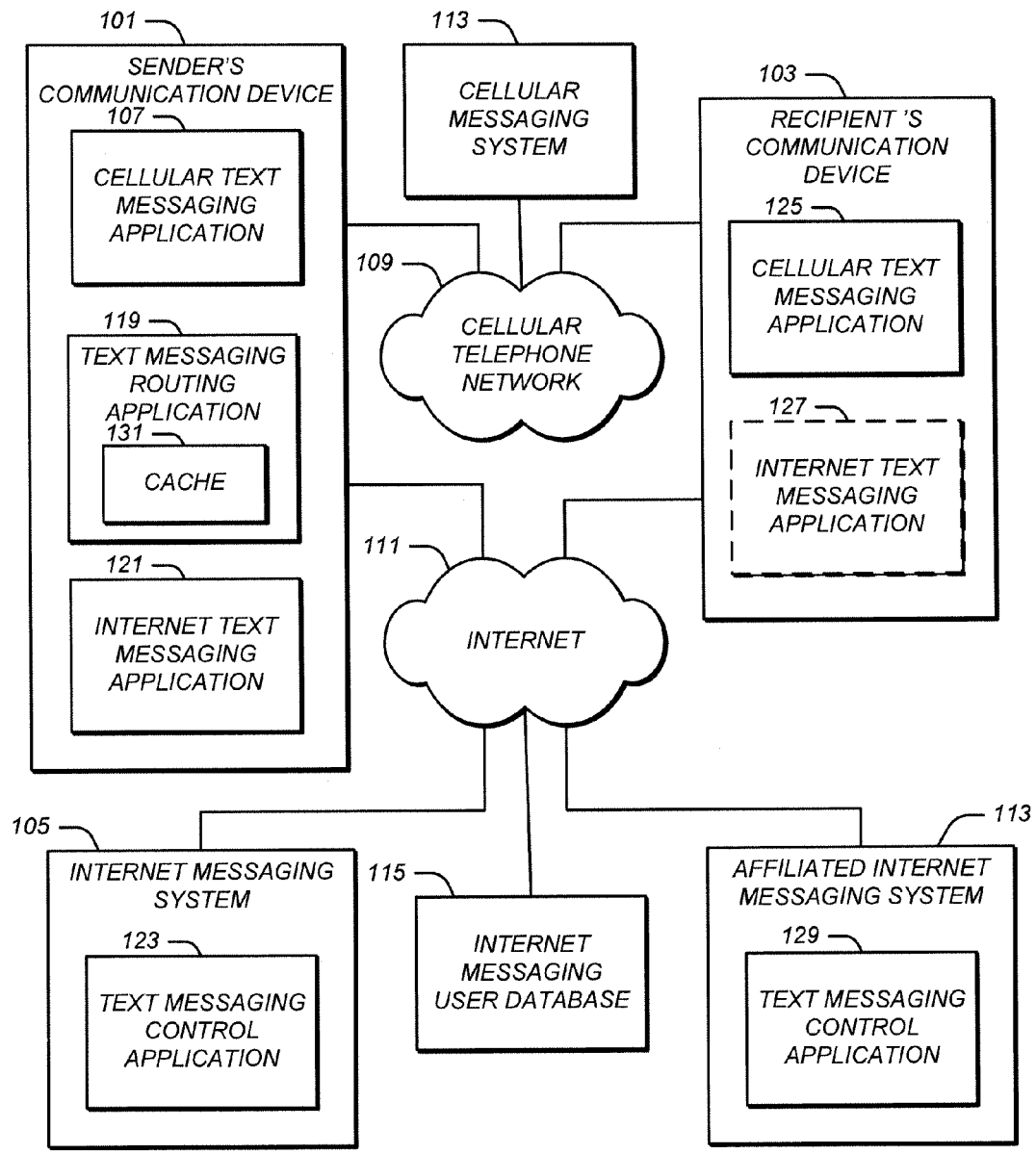
FIG. 1 illustrates an example of various components in a computer messaging network, including a cellular telephone network, the Internet, a sender's communication device, a recipient's communication device, a cellular messaging system, two Internet messaging systems, and an Internet messaging user database.

FIG. 1 illustrates an example of various components in a computer messaging network, including a cellular telephone network 109, the Internet 111, a sender's communication device 101, a recipient's communication device 103, a cellular messaging system 113, two Internet messaging systems 105 and 113, and an Internet messaging user database 115.

The sender's communication device 101 may be any type of communication device. For example, the sender's communication device 101 may be a mobile phone, a laptop, a tablet, or other mobile device capable of sending and receiving messages.

The sender's communication device 101 includes a cellular text messaging application 117. The cellular text messaging application 117 is configured to send text messages to designated recipients over the cellular telephone network 109 using the cellular messaging system 113 under the control of the text messaging routing application 119, as explained below.

The sender's communication device 101 includes an Internet text messaging application 121. The Internet text messaging application 121 is configured to send text messages under the control of the text messaging routing application 119, as explained below, to designated recipients over the Internet 111 using an Internet messaging system with which the user of the Internet text messaging application has registered, such as the Internet messaging system 105. Information about which users have registered with the Internet messaging system 105 is stored in the Internet messaging user database 115.

An Internet messaging system may have agreed with one or more other Internet messaging systems to share their user registration information. This may be the result of a preexisting business arrangement between the entities. As suggested by its name in FIG. 1, for example, affiliated Internet messaging system 113 has agreed to share its user registration information with Internet messaging system 105. Information about which users have registered with the affiliated Internet messaging system 113 is therefore stored in the Internet messaging user database 115 in addition to the information about which users have registered with the Internet messaging system 105. References to "user" are to the sender and recipient communication devices discussed herein.

The registration information within the Internet messaging user database 115 can be provided by the Internet messaging system 105, any of the affiliated Internet messaging systems, such as the affiliated Internet messaging system 113, and/or by any other source.

Although illustrated as a separate system, the Internet messaging user database 115 may be part of the Internet messaging system 105, part of one of its affiliates, such as the affiliated Internet messaging system 113, and/or part of any other system.

Figure 2:
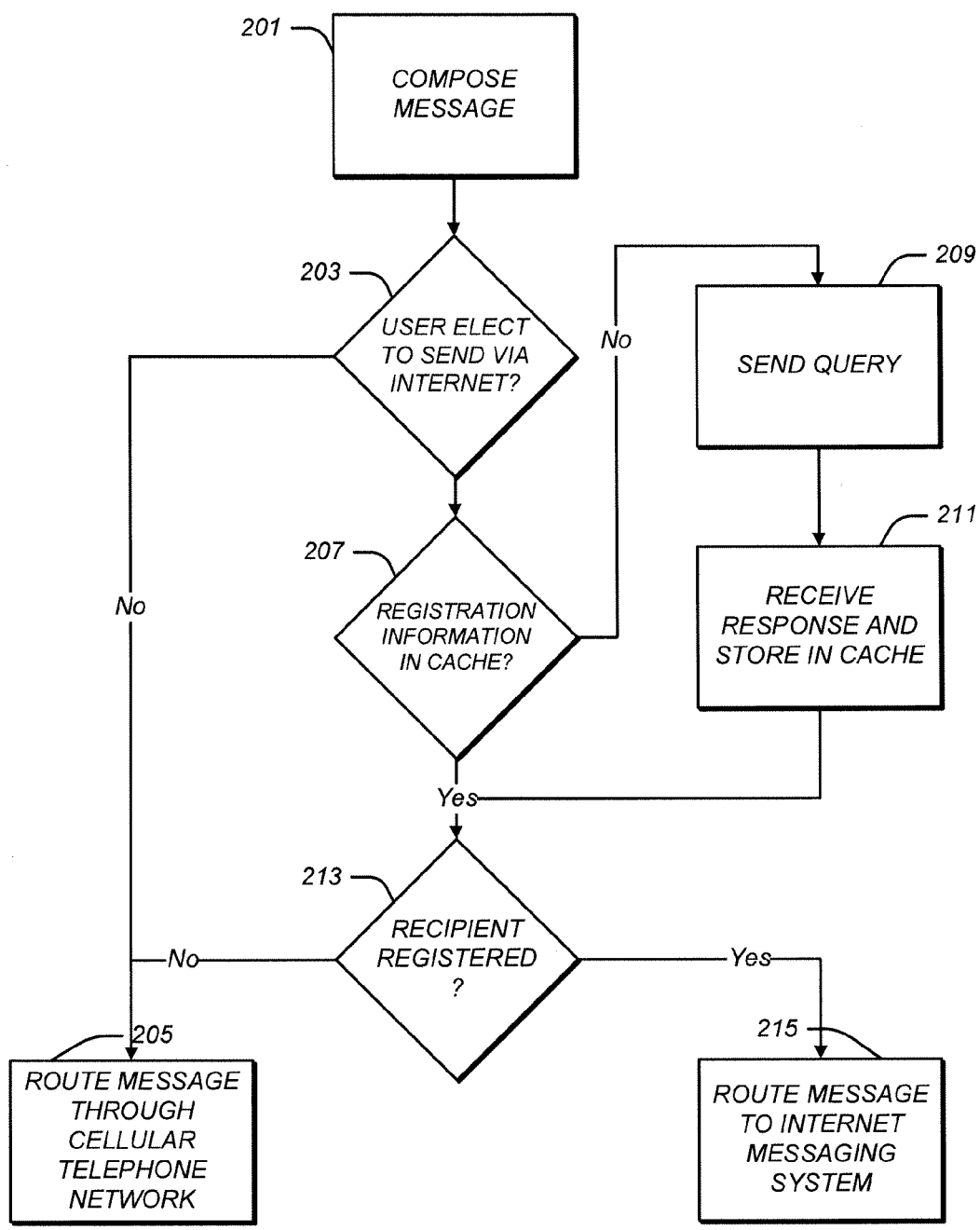
FIG. 2 illustrates an example of a process for routing a text message that is implemented by the text messaging routing application in the sender's communication device illustrated in FIG. 1.

FIG. 2 illustrates an example of a process for routing a text message that is implemented by the text messaging routing application 119 in the sender's communication device 101 illustrated in FIG. 1.

A user composes a text message, as reflected by a Compose Message step 201. The text message may be in any format. For example, the text message may be an SMS or MMS text message.

The user may compose the message using a text messaging routing application 119, which may or may not be part of the Internet text messaging application 121.

The user composes the text message by designating a recipient for the message, typically by providing a cellular telephone number for the recipient, and by entering the text of the message. Other components may be added to the message, such a multimedia components when using MMS.

The text messaging routing application 119 determines whether the user has elected to send the text message over the Internet, as reflected by a User Elect to Send Via Internet decision step 203.

During this step, the text messaging routing application 119 checks to see whether the user has set a configuration parameter indicating whether messages are to be sent, when possible, over the Internet 111 or over the cellular telephone network 109. The configuration parameter may be set in the manner indicated below. In the event that the Internet text messaging application 121 has its own message text messaging formulation dialog box, the text messaging routing application 119 may construe the user's choice of the Internet text messaging application 121 to formulate the text message as indicating the user's election to send the text message via the Internet 111. If the Internet text messaging application 121 is configured to use the text message composed by the cellular text messaging application 117, and if the user has not otherwise indicated the user's preference as to the routing of the text message, the text messaging routing application 119 may present a dialogue box or initiate a different type of user communication to determine which routing is desired by the user.

If the user has not elected to send the text message over the Internet 111, the text messaging routing application 119 causes the text message to be directed to the designated recipient over the cellular telephone network 109 using the services of the cellular messaging system 113, as reflected by a Route Message Through Cellular Telephone Network step 205.

If the user has elected to send the text message through the Internet 111, the text messaging routing application 119 may check a cache 131 to determine whether it contains information about whether the designated recipient is registered with the Internet messaging system 105 or an affiliate thereof, as reflected by a Registration Information in Cache? Decision step 207.

The cache 131 is a temporary data storage device, such as RAM, which stores information about whether the designated recipient is registered with the Internet messaging system that is associated with the Internet text messaging application 121 in the sender's communication device, such as the Internet messaging system 105, or an affiliate thereof, such as the affiliated Internet messaging system 113. The cache 131 may instead be a permanent memory device, such as a hard disk drive or flash memory.

If the cache 131 does not contain information about the registration status of the designated recipient, or if there is no cache 131 or it is not used, the text messaging routing application 119 causes a query to be sent to the Internet messaging system which is associated with the Internet text messaging application 121, such as to the Internet messaging system 105, as reflected by a Send Query step 209. The query asks the Internet messaging system 105 whether the designated recipient of the text message is registered with the Internet messaging system 105 or with an affiliate thereof.

Figure 3:
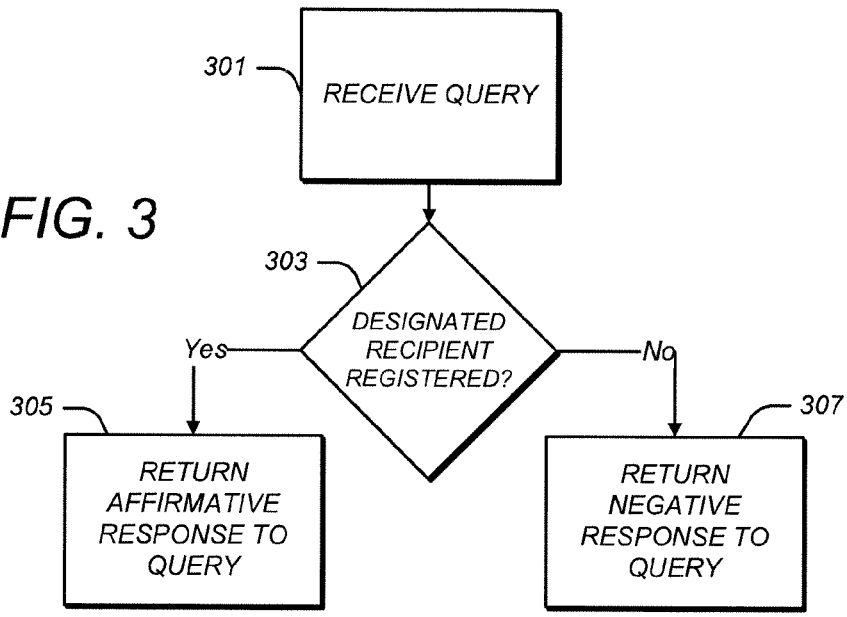
FIG. 3 illustrates an example of a process for responding to a query that is implemented by the Internet messaging system illustrated in FIG. 1.

FIG. 3 illustrates an example of a process for responding to a query that is implemented by the Internet messaging system 105 illustrated in FIG. 1.

The Internet messaging system 105 includes a text messaging control application 123. The text messaging control application 123 receives the query from the text messaging routing application 119. In response, the text messaging control application 123 determines whether the designated recipient is registered with the Internet messaging system 105 or an affiliate thereof, such as with the affiliated Internet messaging system 113, as reflected by a Designated Recipient Registered? decision step 303.

The text messaging control application 123 determines whether the designated recipient is registered with the Internet messaging system 105 or an affiliate thereof by checking the Internet messaging user database 115 to see if the designated recipient is listed as being registered with the Internet messaging system 105 or an affiliate thereof, such as the affiliated Internet messaging system 113.

As illustrated in FIG. 1, the recipient's communication device 103 will typically have a cellular messaging application 125. With respect to an Internet text messaging application 127, however, there are four distinct possibilities: (1) it has no Internet text messaging application; (2) it has an Internet text messaging application that uses the same Internet messaging system (Internet messaging system 105) as the Internet text messaging application 121 in the sender's communication device 101; (3) it has an Internet text messaging application 127 which utilizes the services of an affiliated Internet text messaging system, such as the affiliated Internet text messaging system 113; or (4) it has an Internet text messaging application 127 which utilizes an Internet messaging system other than the Internet messaging system 105 or any affiliate thereof. The Internet text messaging application 127 in the recipient's communication device 103 is illustrated in FIG. 1 by a broken line box to indicate that any one of these four circumstances may exist. The consequence of each circumstance is now discussed.

If the designated recipient has downloaded and installed an Internet text messaging application which utilizes the Internet messaging system 105 or the services of one of its affiliates, such as the affiliated Internet messaging system 113, the information in the Internet messaging user database 115 will indicate this registration status. Otherwise, it will indicate that the designated recipient has not registered.

If the information in the Internet messaging user database 115 indicates that the designated recipient is registered with the Internet messaging system 105 or an affiliate thereof, the text messaging control application 123 sends an affirmative response back to the sender's communication device 101, as reflected by a Return Affirmative Response to Query step 305. If not, the text messaging control application 123 sends a negative response back to the sender's communication device 101, as reflected by a Return Negative Response to Query step 307.

Each of the affiliated Internet messaging systems, such as the affiliated Internet messaging system 105, may similarly contain a text messaging control application, such as a text messaging control application 129. Each of such text messaging control applications may be configured to perform in a manner similar to the text messaging control application 123. Such other text messaging control applications may be called upon when the sender's communication device contains an Internet text messaging application which utilizes the services of such an affiliated Internet messaging system, such as the affiliated Internet messaging system 113, rather than the services of the Internet messaging system 105.

In some configurations, the Internet messaging system 105 will not have any affiliated Internet messaging systems. In this circumstance, the Internet messaging user database 115 will contain information limited to designated recipient who are registered with the Internet messaging system 105.

The response to the query is received by the text messaging routing application 119 and stored in the cache 131, as reflected by a Receive Results and Store in Cache step 211.

The text messaging routing application 119 analyzes the response (or the information in the cache 131 if instead present) to determine if the designated recipient is registered with the Internet messaging system 105 or an affiliate thereof, as reflected by a Recipient Registered? decision step 213. If the designated recipient is not registered with the Internet messaging system 105 or an affiliate thereof, the text messaging routing application 119 will direct that the text message be sent over the cellular telephone network 109 by the cellular text messaging application 117, as reflected by a Route Message Through Cellular Telephone Network step 205. The routing of the text message occurs through the cellular telephone network 109, unless the user elects to send the text message over the Internet 111.

In some configurations, the text messaging routing application 119 may contain a configuration option which the user may set relating to this circumstance. For example, the configuration option may be set to send the text message over the Internet 111 using the Internet text messaging application 121, even when the response to the query or the information in the cache 131 indicates that the designated recipient is not registered with the Internet messaging system 105 or an affiliate thereof. As indicated in the description of related art section above, however, this may result in the address of the sender being obfuscated in the recipient's communication device 103, making it difficult for the recipient to identify the sender of the text message.

If the response to the query or the information in the cache 131 indicates that the designated recipient is registered with the Internet messaging system 105 or an affiliate thereof, the text messaging routing application 119 will cause the text message to be routed over the Internet 111 to the recipient using the Internet text messaging application 121, as reflected by a Route Message to Internet Messaging System step 215. In this instance, the Internet text messaging application will send the text message over the Internet 111 to the Internet messaging system 105 for delivery to the designated recipient. If the recipient belongs to an affiliate, the Internet text messaging application may be configured to send the text message over the Internet 111 to the affiliate.

Figure 4:
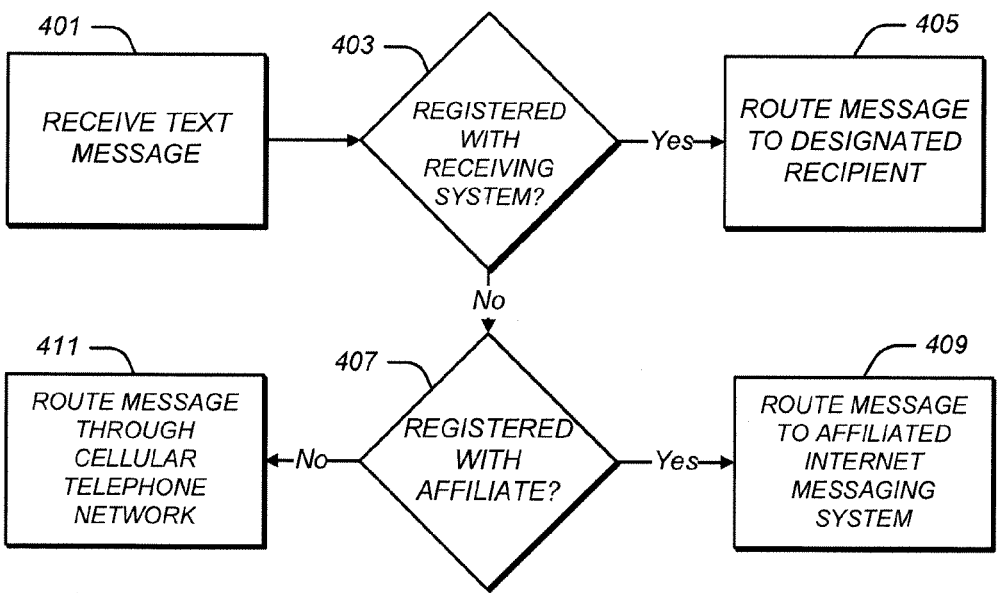
FIG. 4 illustrates an example of a process for routing a text message that is implemented by the Internet messaging system illustrated in FIG. 1.

FIG. 4 illustrates an example of a process for routing a text message that is implemented by the Internet messaging system illustrated in FIG. 1.

In the event that the text message has been routed to the Internet messaging system 105, it will receive the text message, as reflected by a Receive Text Message step 401.

The text messaging control application 123 within the Internet messaging system 105 will determine whether the designated recipient is registered, as reflected by a Registered With Receiving System? decision step 403. This may be done by consulting the information in the Internet messaging user database 115.

If the consultation demonstrates that the designated recipient is registered with the Internet messaging system 105, the text messaging control application 123 causes the Internet messaging system 105 to route text message to the designated recipient over the Internet 111, as reflected by a Route Message to Designated Recipient step 405. This will normally result in the phone number of the sender appearing in the header of the message when received by the recipient.

If the consultation demonstrates that the designated recipient is registered with an affiliate, such as the affiliated Internet messaging system 113, the text messaging control application 123 causes the Internet messaging system 105 to route the text message to the affiliated Internet messaging system, such as to the affiliated Internet messaging system 113, as reflected by a Route Message to Affiliated Internet Messaging System step 409. This will again normally result in the phone number of the sender appearing in the header of the message when received by the recipient.

If the consultation demonstrates that the designated recipient is not registered with either the Internet messaging system 105 or an affiliate thereof, the text messaging control application 123 causes the Internet messaging system 105 to route text message to the designated recipient through the cellular telephone network 109, as reflected by a Route Message Through Cellular Telephone Network step 411.

Unless otherwise indicated, the sender's communication device, recipient's communication device, and each of the Internet messaging systems may each be implemented with a computer system configured to perform the functions which have been described herein for the component, including their respective applications. Each computer system may include one or more computers at the same or different locations. When at different locations, the computers may be configured to communicate with one another through a wired and/or wireless network communication system. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). Each computer may include software (e.g., one or more operating systems, device drivers, application programs, and/or communication programs), which may be configured when executed to cause the computer to perform one or more of the functions which have been described herein for the computer system, including the applications described herein. The software may include programming instructions and associated data and libraries. The software may implement one or more algorithms which may cause the computer to perform each function. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the cellular text messaging application may be accessed by API or function as a software library to phone's operation system. The text messaging routing application may be part of the Internet text messaging application, which users may download from an application store or marketplace. In some configurations, moreover, there may not be any affiliated Internet messaging system.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. A user communication device comprising:
   a user interface device;
   an interface for communication over a cellular telephone network or over the Internet with an Internet messaging system;
   a processor for executing a user request to send a text message as a short message service (SMS) message or a multimedia message service (MMS) message; and
   a memory storing a text messaging routing application, wherein the text messaging routing application is configured to:
   cause a query to be sent from the user communication device to the Internet messaging system asking whether or not the designated recipient of the SMS or MMS text message is registered with the Internet messaging system or an affiliate thereof;
   receive a response to the query in the user communication device via the Internet from the Internet messaging system, the response indicating whether or not the designated recipient of the SMS or MMS text message is registered with the Internet messaging system or the affiliate thereof;
   based on the received response, determine whether the designated recipient is registered with the Internet messaging system or the affiliate thereof, that is capable of routing the SMS or MMS text message via the Internet;
   based on the determination, if the designated recipient is registered with the Internet messaging system or the affiliate thereof, cause the SMS or MMS text message to be sent from the user communication device to the designated recipient over the Internet, including contact information of the user communication device; and
   alternatively, if it is determined that the designated recipient is not registered with the Internet messaging system or the affiliate thereof, cause the SMS or MMS text message to be sent over the cellular telephone network.

2. The user communication device of claim 1, wherein the user communication device includes a cache and the text messaging routing application is configured to:
   temporarily store the response to the query in the cache;
   in response to a subsequent user-request to send a subsequent SMS or MMS text message over a subsequent Internet messaging system to a subsequent designated recipient, check to see whether the cache contains information which indicates that the subsequent designated recipient is registered with the subsequent Internet messaging system or with a subsequent affiliate thereof;
   if the cache does not contain this information, cause a subsequent query to be sent to the subsequent Internet messaging system asking whether the subsequent designated recipient is registered with the subsequent Internet messaging system or with the subsequent affiliate thereof; and
   cause the subsequent SMS or MMS text message to be sent from the user communication device to the subsequent designated recipient over:
   the cellular telephone network if the information in the cache or the response to the query does not indicate that the subsequent designated recipient is registered with the subsequent Internet messaging system or the subsequent affiliate thereof; and
   the Internet using the subsequent Internet messaging system if the information in the cache or the response to the query indicates that the subsequent designated recipient is registered with the subsequent Internet messaging system or the subsequent affiliate thereof.

3. The user communication device of claim 1 further comprising:
   a cellular text messaging application configured to send SMS or MMS text messages to designated recipients over the cellular telephone network under the control of the text messaging routing application; and
   an Internet text messaging application configured to send SMS or MMS text messages to designated recipients over the Internet using the Internet messaging system under the control of the text messaging routing application.

4. The user communication device of claim 3 wherein the text messaging routing application is part of the Internet text messaging application.

5. The user communication device of claim 3 wherein the text messaging routing application, the cellular text messaging application, and the Internet text messaging application are part of a smart phone.

6. The user communication device of claim 1, wherein whether the designated recipient is registered with the Internet messaging system or the affiliate thereof is independent of whether the designated recipient is presently logged-on to the Internet.

7. The user communication device of claim 1, wherein the SMS or MMS text message is sent from the user communication device to the designated recipient, via the cellular telephone network or the Internet, as a same type of communication medium independent of whether the designated recipient is registered with the Internet messaging system or the affiliate.

8. An Internet messaging system comprising:
   an interface for communication over a cellular telephone network or over the Internet with a user communication device; and
   a memory storing a text messaging control application, wherein execution of the text messaging control application on a processor configures the Internet messaging system to:
   receive a query from a sender's user communication device asking whether or not a designated recipient of a text message as a short message service (SMS) message or a multimedia message service (MMS) message is registered with the Internet messaging system or an affiliate thereof; and
   in response to the query:
   determine whether the designated recipient is registered with the Internet messaging system or with the affiliate thereof, wherein the designated recipient that is registered with the Internet messaging system is eligible to receive the SMS or MMS text message, including contact information of the sender's user communication device, from the sender's user communication device over the Internet; and
   send a response back to the sender's user communication device indicating whether or not the designated recipient is registered with the Internet messaging system or the affiliate thereof, wherein, based on the response, the text messaging control application is configured to:

determine whether the designated recipient is registered with the Internet messaging system or the affiliate thereof, that is capable of routing the SMS or MMS text message via the Internet;

based on the determination, if the designated recipient is registered with the Internet messaging system or the affiliate thereof, cause the SMS or MMS text message to be sent from the sender's user communication device to the designated recipient over the Internet, including the contact information of the sender's user communication device; and alternatively, if it is determined that the designated recipient is not registered with the Internet messaging system or the affiliate thereof, cause the SMS or MMS text message to be sent over the cellular telephone network.

9. The Internet messaging system of claim 8 wherein the text messaging control application is configured to:

receive the SMS or MMS text message from the sender's user communication device; and cause the received SMS or MMS text message to be routed to the designated recipient.

10. The Internet messaging system of claim 8 wherein the text messaging control application is configured to determine whether the designated recipient is registered with the Internet messaging system or the affiliate thereof by checking an Internet messaging user database which contains information indicative of designated recipients which are registered with the Internet messaging system and designated recipients which are registered with any affiliate thereof.

11. The Internet messaging system of claim 10 wherein the text messaging control application is configured to:

receive the SMS or MMS text message from the sender's user communication device; and cause the received SMS or MMS text message to be routed to the designated recipient:

over the Internet messaging system if the information in the database indicates that the designated recipient is registered with the Internet messaging system; and over an Internet messaging system of the affiliate if the information in the database indicates that the designated recipient is registered with the affiliate.

12. A non-transitory computer-readable media containing a program of instructions configured to:

execute a user request to send a text message as a short message service (SMS) message or a multimedia message service (MMS) message;

cause a query to be sent from a user communication device to an Internet messaging system asking whether or not a designated recipient of the SSM or MMS text message is registered with the Internet messaging system or an affiliate thereof; and based on a response to the query in the user communication device from the Internet messaging system, the response indicating whether or not the designated recipient of the SMS or MMS text message is registered with the Internet messaging system or the affiliate thereof, determine whether the designated recipient is registered with the Internet messaging system or the affiliate thereof, that is capable of routing the SMS or MMS text message via the Internet;

based on the determination, if the designated recipient is registered with the Internet messaging system or the affiliate thereof, cause the SMS or MMS text message to be sent from the user communication device to the designated recipient over the Internet, including contact information of the user communication device; and alternatively, if it is determined that the designated recipient is not registered with the Internet messaging system or the affiliate thereof, cause the SMS or MMS text message to be sent over a cellular telephone network.

13. The non-transitory computer-readable media of claim 12 wherein the instructions are configured to:

cause the response to the query to be stored in a cache;

in response to a subsequent user-request to send a subsequent SMS or MMS text message over a subsequent Internet messaging system to a subsequent designated recipient, cause a check to be performed to see whether the cache contains information which indicates whether or not the subsequent designated recipient is registered with the subsequent Internet messaging system or a subsequent affiliate thereof;

if the cache does not contain this information, cause a subsequent query to be sent to the subsequent Internet messaging system asking whether or not the subsequent designated recipient is registered with the subsequent Internet messaging system or the subsequent affiliate thereof; and cause the subsequent SMS or MMS text message to be sent to the subsequent designated recipient over:

the cellular telephone network if the information in the cache or the response to the query does not indicate that the subsequent designated recipient is registered with the subsequent Internet messaging system or the subsequent affiliate thereof; and the Internet using the subsequent Internet messaging system if the information in the cache or the response to the query does indicate that the subsequent designated recipient is registered with the subsequent Internet messaging system or the subsequent affiliate thereof.

14. The non-transitory computer-readable media of claim 12 wherein the instructions are configured to run in a smartphone.

15. A non-transitory computer-readable media containing a program of instructions configured to:

receive a query from a sender's user communication device asking whether or not a designated recipient of a text message the user initially requested to be sent as a short message service (SMS) or multimedia messaging service (MMS) is registered with an Internet messaging system or an affiliate thereof; and in response to the query:

cause a determination to be made whether or not the designated recipient is registered with the Internet messaging system or the affiliate thereof, wherein the designated recipient that is registered with the Internet messaging system is eligible to receive, from the sender's user communication device, the SMS or MMS text message over the Internet messaging system, including contact information of the sender's user communication device; and cause a response to be sent back to the sender's user communication device indicating whether or not the designated recipient is registered with the Internet messaging system or the affiliate thereof~ wherein, based on the response, the instructions are configured to:

determine whether the designated recipient is registered with the Internet messaging system or the affiliate thereof, that is capable of routing the SMS or MMS text message via the Internet;

based on the determination, if the designated recipient is registered with the Internet messaging system or the affiliate thereof, cause the SMS or MMS text message to be sent from the sender's user communication device to the designated recipient over the Internet, including the contact information of the sender's user communication device; and alternatively, if it is determined that the designated recipient is not registered with the Internet messaging system or the affiliate thereof, cause the SMS or MMS text message to be sent over a cellular telephone network.

16. The non-transitory computer-readable media of claim 15 wherein the instructions are configured to:

cause the SMS or MMS text message from the sender's user communication device to be received; and cause the received SMS or MMS text message to be routed to the designated recipient.

17. The non-transitory computer-readable media of claim 16 wherein the instructions are configured to determine whether the designated recipient is registered with the Internet messaging system or the affiliate thereof by checking an Internet messaging user database which contains information indicative of designated recipients which are registered with the Internet messaging system and designated recipients which are registered with any affiliate thereof.

18. The non-transitory computer-readable media of claim 15 wherein the instructions are configured to:

cause the SMS or MMS text message to be received from the sender's user communication device; and cause the received SMS or MMS text message to be routed to the designated recipient:

over the Internet messaging system if the information in the database indicates that the designated recipient is registered with the Internet messaging system; and over an Internet messaging system managed by the affiliate if the information in the database indicates that the designated recipient is registered with the affiliate.

* * * * *